United States Patent
Choi et al.

(10) Patent No.: US 11,797,215 B2
(45) Date of Patent: Oct. 24, 2023

(54) MEMORY DEVICE AND MEMORY SYSTEM PERFORMING ERROR CHECK AND SCRUB OPERATION

(71) Applicant: SK hynix Inc., Icheon-si (KR)

(72) Inventors: Heeeun Choi, Icheon-si (KR); Hoi Ju Chung, Icheon-si (KR); Kwang Soon Kim, Icheon-si (KR); Ji Eun Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 34 days.

(21) Appl. No.: 17/711,545

(22) Filed: Apr. 1, 2022

(65) Prior Publication Data

US 2023/0185473 A1 Jun. 15, 2023

Related U.S. Application Data

(60) Provisional application No. 63/287,877, filed on Dec. 9, 2021.

(51) Int. Cl.
*G06F 3/06* (2006.01)

(52) U.S. Cl.
CPC .......... *G06F 3/0652* (2013.01); *G06F 3/0619* (2013.01); *G06F 3/0673* (2013.01)

(58) Field of Classification Search
CPC ..... G06F 3/0652; G06F 3/0619; G06F 3/0673
See application file for complete search history.

(56) References Cited

U.S. PATENT DOCUMENTS

| | | | |
|---|---|---|---|
| 2017/0060681 A1* | 3/2017 | Halbert | G06F 3/064 |
| 2017/0221546 A1* | 8/2017 | Loh | G06F 3/0659 |
| 2022/0148645 A1* | 5/2022 | Meier | G11C 29/52 |
| 2023/0083193 A1* | 3/2023 | Zhou | G11C 29/52 |
| | | | 714/42 |

FOREIGN PATENT DOCUMENTS

| | | |
|---|---|---|
| KR | 1020170056823 A | 5/2017 |
| KR | 1020170130788 A | 11/2017 |

* cited by examiner

*Primary Examiner* — Jason W Blust
(74) *Attorney, Agent, or Firm* — WILLIAM PARK & ASSOCIATES LTD.

(57) ABSTRACT

A memory device includes an auto error check scrub (ECS) control circuit configured to generate an auto ECS command for performing an ECS operation based on a refresh control signal. The memory device also includes a burst ECS control circuit configured to generate an internal burst ECS command for performing the ECS operation every set period based on a burst ECS command and an ECS end flag. The memory device further includes an ECS address generation circuit configured to generate an ECS address for the ECS operation by counting an input of the auto ECS command or the internal burst ECS command and to generate the ECS end flag based on a value of the ECS address.

20 Claims, 13 Drawing Sheets

MEMORY DEVICE AND MEMORY SYSTEM PERFORMING ERROR CHECK AND SCRUB OPERATION

CROSS-REFERENCE TO RELATED APPLICATION

The present application claims priority under 35 U.S.C. § 119(e) to Provisional Patent Application No. 63/287,877, filed on Dec. 9, 2021, in the U.S. Patent and Trademark Office, which is incorporated herein by reference in its entirety.

BACKGROUND

The present disclosure relates to a memory device and memory system performing an error check scrub (hereinafter referred to as "ECS") operation.

SUMMARY

Some embodiments of the present disclosure are directed to a memory device which can improve the reliability of data transmission by using an error correction code (ECC) which detects and corrects an error in data. The memory device may identify the number of error bits in data stored in a memory cell and a location of a memory cell in which an error has occurred through a circuit implemented using an ECC, and may perform an ECS operation of re-writing, into a memory cell, the data whose error has been corrected.

In an embodiment, a memory device may include an auto error check scrub (ECS) control circuit configured to generate an auto ECS command for performing an ECS operation based on a refresh control signal, a burst ECS control circuit configured to generate an internal burst ECS command for performing the ECS operation every set period based on a burst ECS command and an ECS end flag, and an ECS address generation circuit configured to generate an ECS address for the ECS operation by counting an input of the auto ECS command or the internal burst ECS command and to generate the ECS end flag based on a value of the ECS address.

In an embodiment, a memory system may include a memory device configured to perform an error check scrub (ECS) operation every set period when receiving a command for continuously performing the ECS operation, sequentially increase a value of an ECS address when performing the ECS operation, and generate weak cell information from a code word stored in a cell array corresponding to the value of the ECS address. The memory system may also include a memory controller configured to generate a command for continuously performing the ECS operation by detecting whether power supplied to the memory device is to be blocked and receive and store the weak cell information.

In an embodiment, a memory system may include a memory device configured to sequentially increase a value of an error check scrub (ECS) address whenever a command for performing the ECS operation is received, generate weak cell information from a code word stored in a cell array corresponding to the value of the ECS address, and generate an ECS end flag based on the value of the ECS address. The memory system may also include a memory controller configured to generate the command for performing the ECS operation every first set period based on a power-off signal and the ECS end flag, and receive and store the weak cell information. The power-off signal may be generated by detecting whether power supplied to the memory device is to be blocked.

DETAILED DESCRIPTION

In the descriptions of the following embodiments, the term "preset" indicates that the numerical value of a parameter is previously decided, when the parameter is used in a process or algorithm. According to an embodiment, the numerical value of the parameter may be set when the process or algorithm is started or while the process or algorithm is performed.

Terms such as "first" and "second," which are used to distinguish among various components, are not limited by the components. For example, a first component may be referred to as a second component, and vice versa.

When one component is referred to as being "coupled" or "connected" to another component, it should be understood that the components may be directly coupled or coupled to each other or coupled or coupled to each other through another component interposed therebetween. On the other hand, when one component is referred to as being "directly coupled" or "directly connected" to another component, it should be understood that the components are directly coupled or coupled to each other without another component interposed therebetween.

"Logic high level" and "logic low level" are used to describe the logic levels of signals. A signal having "logic high level" is distinguished from a signal having "logic low level." For example, when a signal having a first voltage corresponds to a signal having a "logic high level," a signal having a second voltage may correspond to a signal having a "logic low level." According to an embodiment, a "logic high level" may be set to a voltage higher than a "logic low level," According to an embodiment, the logic levels of signals may be set to different logic levels or opposite logic levels. For example, a signal having a logic high level may be set to have a logic low level in different embodiments, and a signal having a logic low level may be set to have a logic high level in different embodiments.

Hereafter, the teachings of the present disclosure will be described in more detail through embodiments. The embodiments are only used to exemplify the teachings of the present disclosure, and the scope of the present disclosure is not limited by the embodiments.

Figure 1:
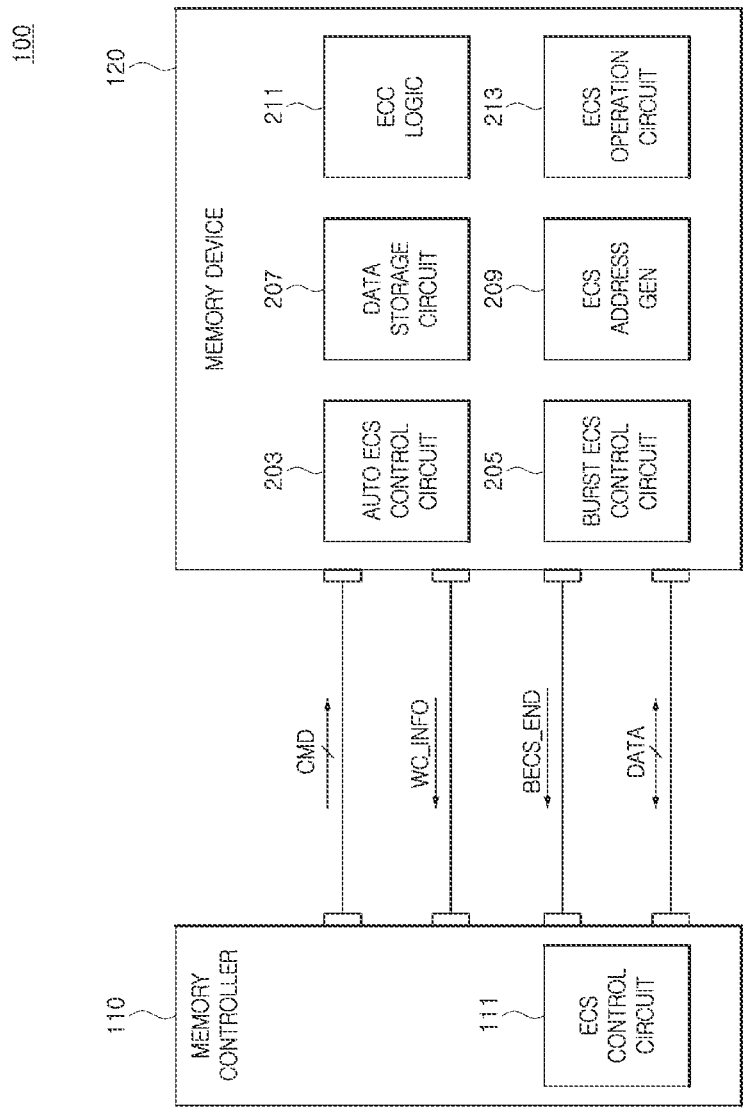
FIG. 1 is a block diagram illustrating a configuration of a memory system according to an embodiment of the present disclosure.

FIG. 1 is a block diagram illustrating a configuration of a memory system 100 according to an embodiment of the present disclosure. As illustrated in FIG. 1, the memory system 100 may include a memory controller 110 and a memory device 120. The memory device 120 may include multiple cell arrays in which data DATA is stored.

The memory controller 110 may include an error check scrub (ECS) control circuit 111. The memory controller 110 may generate a command CMD that enables the memory device 120 to perform various internal operations, such as a write operation, a read operation, a refresh operation, a self-refresh mode, and an ECS operation. The memory controller 110 may continuously generate the command CMD for performing an ECS operation through the ECS control circuit 111. The ECS control circuit 111 may control to generate the command CMD for continuously performing an ECS operation, when checking weak cell information WC_INFO for all cell arrays included in the memory device 120 in an interval in which power supplied to the memory device 120 is maintained. The weak cell information WC_INFO may include information on the number of error bits of a code word (CW in FIG. 3) stored in at least one cell array and a location of the cell array where the code word CW in which an error bit has occurred is stored. Furthermore, the ECS control circuit 111 may control to generate the command CMD for continuously performing an ECS operation by detecting whether power supplied to the memory device 120 is to be blocked.

The memory device 120 may include an auto ECS control circuit 203, a burst ECS control circuit 205, a data storage circuit 207, an ECS address generation circuit (ECS ADDRESS GEN) 209, an ECC logic circuit (ECC LOGIC) 211, and an ECS operation circuit 213.

The memory device 120 may perform a write operation of receiving data DATA from the memory controller 110 and storing the received data in a cell array, based on the command CMD for performing the write operation. The memory device 120 may perform a read operation of outputting, to the memory controller 110, data DATA stored in a cell array based on the command CMD for performing the read operation. The memory device 120 may perform a refresh operation of detecting and amplifying data DATA stored in a cell array and re-storing the amplified data in a cell array, based on the command CMD for performing the refresh operation. Furthermore, the memory device 120 may perform a refresh operation every refresh period in the self-refresh mode based on the command CMD for entering the self-refresh mode.

The memory device 120 may generate the weak cell information WC_INFO through an ECS operation of identifying the number of error bits of a code word (CW in FIG. 3) stored in a cell array and a location of the cell array where the code word CW in which an error bit has occurred is stored. The ECS operation may be accompanied by an operation of correcting a bit in which an error has occurred among bits of the code word CW and re-storing, in a cell array, the code word CW whose error bit has been corrected.

The memory device 120 may perform an ECS operation instead of a refresh operation whenever a refresh control signal (REF_CTR in FIG. 3) for performing the refresh operation is generated a predetermined number of times, based on the command CMD for performing the refresh operation and the command CMD for entering the self-refresh mode. The predetermined number may be variously set based on an internal temperature of the memory device 120. The memory device 120 may sequentially perform ECS operations on a cell array corresponding to a value of an ECS address (ECS_ADD in FIG. 3), whenever the refresh control signal REF_CTR is generated a predetermined number of times. The memory device 120 may sequentially increase values of the ECS address ECS_ADD, corresponding to a cell array, from a start value to an end value of the ECS address ECS_ADD by counting the number of ECS operations executed, That is, the memory device 120 may check whether a bit in which an error has occurred is present among bits of a code word CW stored in the cell array by sequentially changing a location of a cell array in which the code word CW is stored based on the number of ECS operations executed.

The memory device 120 may continuously perform, every set period, an ECS operation on a cell array on which an ECS operation is not performed, while sequentially performing ECS operations on all cell arrays, by receiving the command CMD for continuously performing the ECS operation from the memory controller 110 in an interval in which power supplied to the memory device 120 is maintained. The set period may be variously set in different embodiments. Furthermore, the memory device 120 may continuously perform, every set period, an ECS operation on a cell array on which an ECS operation is not performed, while sequentially performing ECS operations on all cell arrays, by receiving the command CMD for continuously performing an ECS operation from the memory controller 110 before the power is blocked. Accordingly, the memory device 120 can improve the reliability of data transmission, and can prevent an ECS operation from being unevenly performed on only a specific cell array as power is supplied again. The memory device 120 may generate a burst ECS end flag BECS_END, indicating that the continuous execution of an ECS operation has been completed, when the ECS address (ECS_ADD in FIG. 3) has an end value.

The auto ECS control circuit 203 may generate an auto ECS command (AECS in FIG. 3) for performing an ECS operation whenever the refresh control signal (REF_CTR in FIG. 3) for performing a refresh operation is generated a predetermined number of times, based on the command CMD for performing a refresh operation and the command CMD for entering the self-refresh mode.

The burst ECS control circuit 205 may generate, every set period, an internal burst ECS command (IBECS in FIG. 3) for performing an ECS operation when the command CMD for continuously performing an ECS operation is received. The burst ECS control circuit 205 may generate the burst ECS end flag BECS_END when the continuous execution of an ECS operation is completed.

The data storage circuit 207 may include multiple cell arrays in which the code word (CW in FIG. 3) is stored. The code word CW may include data DATA and parity.

Figure 3:
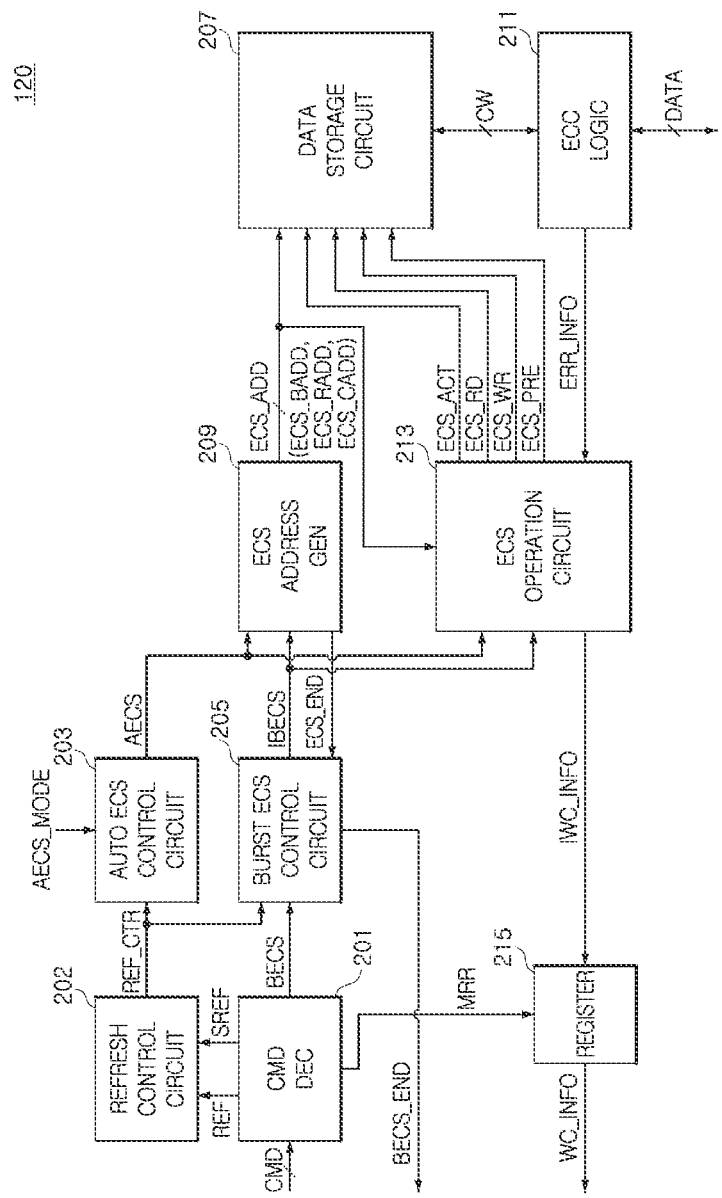
FIG. 3 is a block diagram illustrating an example configuration of a memory device illustrated in FIG. 1.

The ECS address generation circuit 209 may sequentially increase values of an ECS address (ECS_ADD in FIG. 3), corresponding to multiple cell arrays included in the data storage circuit 207, from a start value to an end value of the ECS address, by counting the input of the auto ECS command (AECS in FIG. 3) or the internal burst ECS command (IBECS in FIG. 3).

The ECC logic circuit 211 may generate error information (ERR_INFO in FIG. 3), including information on the number of error bits of a code word (CW in FIG. 3), by decoding the code word CW outputted by a cell array included in the data storage circuit 207.

Figure 2:
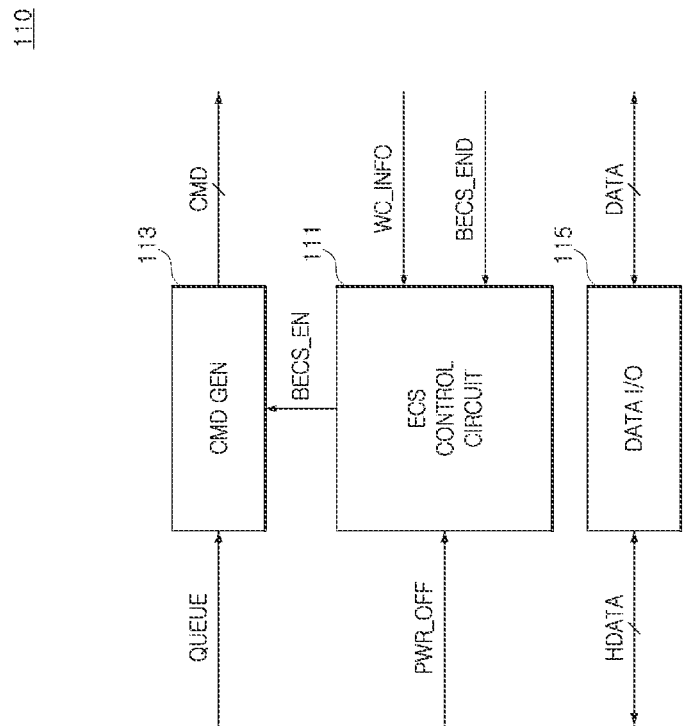
FIG. 2 is a block diagram illustrating an example configuration of a memory controller illustrated in FIG. 1.

When performing an ECS operation based on one of the auto ECS command (AECS in FIG. 3) and the internal burst ECS command (IBECS in FIG. 3), the ECS operation circuit 213 may generate the weak cell information WC_INFO by receiving the error information (ERR_INFO in FIG. 3) from the ECC logic circuit 211, FIG. 2 is a block diagram illustrating an example configuration of the memory controller 110 illustrated in FIG. 1. As illustrated in FIG. 2, the memory controller 110 may include the ECS control circuit 111, a command generation circuit (CMD GEN) 113, and a data input and output circuit (DATA I/O) 115.

The ECS control circuit 111 may receive the weak cell information WC_INFO from the memory device (120 in FIG. 1) and store the weak cell information WC_INFO. The ECS control circuit 111 may activate a burst ECS enable signal BECS_EN, when checking the weak cell information WC_INFO for all cell arrays included in the memory device 120, Furthermore, the ECS control circuit 111 may activate the burst ECS enable signal BECS_EN when a power-off signal PWR_OFF is activated. The power-off signal PWR_OFF may be generated by detecting, by the memory controller 110, whether power supplied to the memory device 120 is to be blocked. The ECS control circuit 111 may recognize that the continuous execution of an ECS operation has been completed by receiving the burst ECS end flag BECS_END from the memory device 120.

The command generation circuit 113 may generate the command CMD that enables the memory device (120 in FIG. 1) to perform various internal operations by receiving a command queue QUEUE from a host (not illustrated), The command generation circuit 113 may generate the command CMD for continuously performing an ECS operation when the burst ECS enable signal BECS_EN is activated.

The data input and output circuit 115 may transmit, to the memory device (120 in FIG. 1), host data HDATA received from the host (not illustrated) as data DATA, and may transmit, to the host, data DATA received from the memory device 120 as host data HDATA.

FIG. 3 is a block diagram illustrating an example configuration of the memory device 120 illustrated in FIG. 1. As illustrated in FIG. 3, the memory device 120 may include a command decoder (CMD DEC) 201, a refresh control circuit 202, the auto ECS control circuit 203, the burst ECS control circuit 205, the data storage circuit 207, the ECS address generation circuit (ECS ADDRESS GEN) 209, the ECC logic circuit (ECC LOGIC) 211, the ECS operation circuit 213, and a register 215.

The command decoder 201 may generate a refresh command REF, a self-refresh signal SREF, a burst ECS command BECS, and a register read command MRR by decoding the command CMD. The command decoder 201 may generate the refresh command REF by decoding the command CMD for performing a refresh operation. The command decoder 201 may generate the self-refresh signal SREF by decoding the command CMD for entering the self-refresh mode. The self-refresh signal SREF may be activated during an interval in which the self-refresh mode is performed. The command decoder 201 may generate the burst ECS command BECS by decoding the command CMD for continuously performing an ECS operation. The command decoder 201 may generate the register read command MRR by decoding the command CMD for performing a register read operation. The register read command MRR may be activated in order to output, as the weak cell information WC_INFO, internal weak cell information IWC_INFO stored in the register 215.

The refresh control circuit 202 may generate the refresh control signal REF_CTR for performing a refresh operation based on the refresh command REF and the self-refresh signal SREF. The refresh control circuit 202 may generate the refresh control signal REF_CTR, when receiving the refresh command REF or when a refresh period elapses in the self-refresh mode.

The auto ECS control circuit 203 may generate the auto ECS command AECS for performing an ECS operation based on the refresh control signal REF_CTR for performing a refresh operation when an auto ECS mode signal AECS_MODE is activated, More specifically, the auto ECS control circuit 203 may activate the auto ECS command AECS whenever the refresh control signal REF_CTR for performing a refresh operation is received a predetermined number of times when the auto ECS mode signal AECS_MODE is activated. The auto ECS mode signal AECS_MODE may be generated from a mode register (not illustrated) in order to enable the auto ECS control circuit 203.

The burst ECS control circuit 205 may generate the internal burst ECS command IBECS and the burst ECS end flag BECS_END based on the burst ECS command BECS, the ECS end flag ECS_END and the refresh control signal REF_CTR. The ECS end flag ECS_END may be activated in order to indicate that the execution of an ECS operation for all cell arrays included in the data storage circuit 207 has been completed. The burst ECS end flag BECS_END may be activated in order to indicate that the continuous execution of an ECS operation for all the cell arrays included in the data storage circuit 207 has been completed.

The burst ECS control circuit 205 may generate the internal burst ECS command IBECS for performing an ECS operation every set period based on the burst ECS command BECS and the ECS end flag ECS_END. More specifically, the burst ECS control circuit 205 may activate the internal burst ECS command IBECS every set period from a time when the burst ECS command BECS is activated to a time when the ECS end flag ECS_END is activated. The set period may be set to be shorter than a period in which the auto ECS command AECS is activated in the auto ECS control circuit 203. The burst ECS control circuit 205 may deactivate the internal burst ECS command IBECS during an interval in which a refresh operation is performed based on the refresh control signal REF_CTR. The burst ECS control circuit 205 may generate the burst ECS end flag BECS_END from the ECS end flag ECS_END based on the burst ECS command BECS. More specifically, the burst ECS control circuit 205 may activate the burst ECS end flag BECS_END based on the burst ECS command BECS when the ECS end flag ECS_END is activated in an interval in which an ECS operation is performed. Accordingly, the burst ECS control circuit 205 can improve the reliability of data transmission and prevent an ECS operation unevenly performed on only a specific cell array as power is supplied to the memory device 120 again, by performing a continuous ECS operation on a cell array on which an ECS operation is not performed while ECS operations are sequentially performed on all cell arrays based on the burst ECS command BECS.

The data storage circuit 207 may include multiple cell arrays in which a code word CW is stored. The code word CW may include data DATA and parity. Each of the multiple cell arrays may correspond to a value of the ECS address ECS_ADD. The ECS address ECS_ADD may include an ECS bank address ECS_BADD, an ECS row address ECS_RADD, and an ECS column address ECS_CADD. The data storage circuit 207 may include first to L-th memory banks (207<1:L> in FIG. 4) each corresponding to a value of the ECS bank address ECS_BADD, Each of the first to L-th memory banks (207<1:L> in FIG. 4) may include multiple cell arrays coupled to first to M-th word lines (WL<1:M> in FIG. 4) each corresponding to a value of the ECS row address ECS_RADD and first to N-th column lines (CL<1:N> in FIG. 4) each corresponding to a value of the ECS column address ECS_CADD. Each of "L," "M," and "N" may be set as a natural number equal to or greater than 2.

The data storage circuit 207 may store a code word CW in a cell array corresponding to a value of the ECS address ECS_ADD and output the stored code word CW, based on an ECS active control signal ECS_ACT, an ECS read control signal ECS_RD, an ECS write control signal ECS_WR, and an ECS precharge control signal ECS_PRE. More specifically, the data storage circuit 207 may activate a word line corresponding to a value of the ECS row address ECS_RADD when the ECS active control signal ECS_ACT is activated. The data storage circuit 207 may output, to the ECC logic circuit 211, a code word CW stored in a cell array coupled to an activated word line and a column line corresponding to a value of the ECS column address ECS_CADD, when the ECS read control signal ECS_RD is activated. The data storage circuit 207 may store a code word CW, whose error bit has been corrected, in a cell array coupled to an activated word line and a column line corresponding to a value of the ECS column address ECS_CADD through the ECC logic circuit 211 when the ECS write control signal ECS_WR is activated. The data storage circuit 207 may deactivate a word line corresponding to a value of the ECS row address ECS_RADD when the ECS precharge control signal ECS_PRE is activated. A configuration and operation method of the data storage circuit 207 are described below in detail with reference to FIG. 4.

The ECS address generation circuit 209 may generate the ECS address ECS_ADD and the ECS end flag ECS_END based on the auto ECS command AECS and the internal burst ECS command IBECS.

The ECS address generation circuit 209 may sequentially increase values of the ECS address ECS_ADD from a start value to an end value of the ECS address ECS_ADD by counting the input of the auto ECS command AECS or the internal burst ECS command IBECS. The start value and end value of the ECS address ECS_ADD may be set as "1" and "K," respectively. An initial value of the ECS address ECS_ADD may be set as "K." The ECS address generation circuit 209 may set a value of the ECS address ECS_ADD as the number of received auto ECS commands AECS by counting the input of the auto ECS command AECS. For example, the ECS address generation circuit 209 may set a value of the ECS address ECS_ADD from "K" to "1" when receiving the auto ECS command AECS for the first time. Thereafter, the ECS address generation circuit 209 may set a value of the ECS address ECS_ADD from "1" to "2" when receiving the auto ECS command AECS for the second time. When receiving the internal burst ECS command IBECS every set period, the ECS address generation circuit 209 may sequentially increase values of the ECS address ECS_ADD from a next value of the number of received auto ECS commands AECS to an end value thereof. For example, the ECS address generation circuit 209 may sequentially increase a value of the ECS address ECS_ADD from "3" to "K" when receiving the internal burst ECS command IBECS every set period in the state in which the auto ECS command AECS has been received twice.

The ECS address generation circuit 209 may generate the ECS end flag ECS_END based on a value of the ECS address ECS_ADD. More specifically, the ECS address generation circuit 209 may activate the ECS end flag ECS_END when the ECS address ECS_ADD has an end value. When the ECS address ECS_ADD has an end value, values of the ECS bank address ECS_BADD, the ECS row address ECS_RADD, and the ECS column address ECS_CADD may correspond to a predetermined memory bank, a predetermined word line, and a predetermined column line, respectively. For example, when values of the ECS bank address ECS_BADD, the ECS row address ECS_RADD, and the ECS column address ECS_CADD correspond to an L-th memory bank (207<L> in FIG. 4), an M-th word line (WL<M> in FIG. 4), and an N-th column line (CL<N> in FIG. 4), respectively, the ECS address generation circuit 209 may activate the ECS end flag ECS_END. A configuration and operation method of the ECS address generation circuit 209 are described below in detail with reference to FIG. 5.

The ECC logic circuit 211 may generate a code word CW by encoding data DATA, and may generate data DATA and the error information ERR_INFO by decoding a code word CW. The ECC logic circuit 211 may be implemented as a logic circuit using an error correction code (ECC). The ECC logic circuit 211 may generate the error information ERR_INFO, including information on the number of error bits of a code word CW and whether a code word CW in which an error bit has occurred is correctable, by decoding the code word CW based on an actuated ECS read control signal ECS_RD in an ECS operation. Whether a code word CW in which an error bit has occurred is correctable may be determined by the number of error bits of the code word CW. The ECC logic circuit 211 may correct a bit in which an error has occurred among bits of a code word CW by decoding the code word CW. The ECC logic circuit 211 may transmit, to the data storage circuit 207, a code word CW whose error bit has been corrected based on an activated ECS write control signal ECS_WR in an ECS operation.

The ECS operation circuit 213 may sequentially activate the ECS active control signal ECS_ACT, the ECS read control signal ECS_RD, the ECS write control signal ECS_WR, and the ECS precharge control signal ECS_PRE based on the auto ECS command AECS whenever an ECS operation is performed. The ECS operation circuit 213 may receive the error information ERR_INFO from the ECC logic circuit 211 based on the activated ECS read control signal ECS_RD. The ECS operation circuit 213 may activate the ECS write control signal ECS_WR for re-storing, in a cell array, a code word CW whose error bit has been corrected by detecting whether a bit in which an error has occurred is correctable among bits of the code word CW based on the auto ECS command AECS and the error information ERR_INFO.

When performing an ECS operation based on the internal burst ECS command IBECS, the ECS operation circuit 213 may selectively activate the ECS active control signal ECS_ACT, the ECS read control signal ECS_RD, and the ECS precharge control signal ECS_PRE based on a value of the ECS address ECS_ADD. For example, the ECS operation circuit 213 may activate the ECS active control signal ECS_ACT and the ECS read control signal ECS_RD when receiving the internal burst ECS command IBECS in the state in which a value of the ECS column address ECS_CADD corresponds to a first column line (CL<1> in FIG. 4). The ECS operation circuit 213 may activate the ECS read control signal ECS_RD when receiving the internal burst ECS command IBECS in the state in which a value of the ECS column address ECS_CADD corresponds to one of second to (N−1)-th column lines (CL<2:N−1> in FIG. 4). The ECS operation circuit 213 may activate the ECS read control signal ECS_RD and the ECS precharge control signal ECS_PRE when receiving the internal burst ECS command IBECS in the state in which a value of the ECS column address ECS_CADD corresponds to an N-th column line (CL<N> in FIG. 4). In the present embodiment, when performing an ECS operation based on the internal burst ECS command IBECS, the ECS operation circuit 213 may deactivate the ECS write control signal ECS_WR for restoring, in a cell array, a code word CW whose error bit has been corrected so that a continuous ECS operation is rapidly performed. This is merely an embodiment. According to an embodiment, the ECS operation circuit 213 may activate the ECS write control signal ECS_WR when performing an ECS operation based on the internal burst ECS command IBECS.

The ECS operation circuit 213 may generate the internal weak cell information IWC_INFO based on the error information ERR_INFO and the ECS address ECS_ADD. The internal weak cell information IWC_INFO may include information on the number of error bits of a code word CW stored in at least one cell array and a location of a cell array in which the code word CW in which an error bit has occurred is stored.

According to an embodiment, when the number of error bits of a code word CW included in the error information ERR_INFO for each cell array coupled to a word line is greater than a threshold value, the ECS operation circuit 213 may generate the internal weak cell information IWC_INFO. For example, when the number of bits in which an error has occurred among bits of a code word CW stored in cell arrays coupled to a first word line (WL<1> in FIG. 4) is greater than a threshold value, the ECS operation circuit 213 may generate the internal weak cell information IWC_INFO, including information on the number of error bits that have occurred in the first word line (WL<1> in FIG. 4) and the row address ECS_RADD corresponding to the first word line (WL<1> in FIG. 4).

According to an embodiment, when the number of error bits of a code word CW included in the error information ERR_INFO for each cell array is greater than a threshold value, the ECS operation circuit 213 may generate the internal weak cell information IWC_INFO. For example, when the number of bits in which an error has occurred among bits of a code word CW stored in a cell array coupled to the first word line (W1<1> in FIG. 4) and the first column line (CL<1> in FIG. 4) is greater than a threshold value, the ECS operation circuit 213 may generate the internal weak cell information IWC_INFO, including information on the number of error bits that have occurred in the cell array coupled to the first word line (WL<1> in FIG. 4) and the first column line (CL<1> in FIG. 4), a row address ECS_RADD corresponding to the first word line (WL<1> in FIG. 4) and a column address ECS_CADD corresponding to the first column line (CL<1> in FIG. 4).

The register 215 may store the internal weak cell information IWC_INFO. When the register read command MRR is activated, the register 215 may output, as the weak cell information WC_INFO, the internal weak cell information IWC_INFO stored in the register 215.

Figure 4:
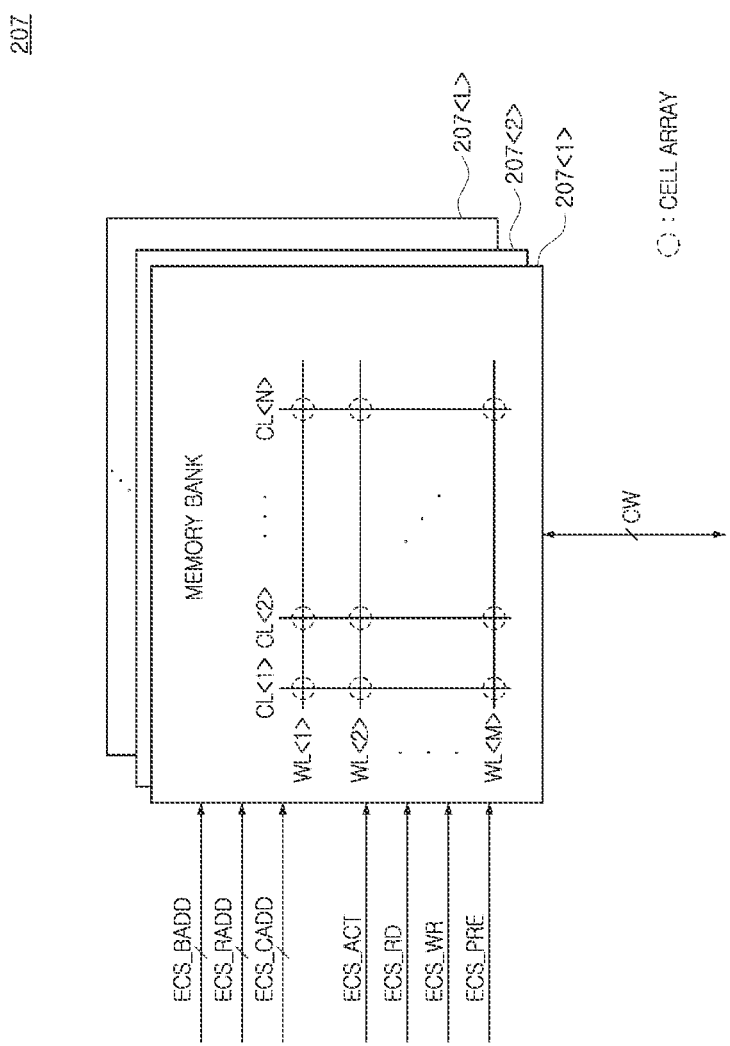
FIG. 4 is a diagram illustrating an example configuration of a data storage circuit illustrated in FIG. 3.

FIG. 4 is a diagram illustrating an example configuration of the data storage circuit 207 illustrated in FIG. 3. As illustrated in FIG. 4, the data storage circuit 207 may include the first to L-th memory banks 207<1:L> each corresponding to a value of the ECS bank address ECS_BADD. The data storage circuit 207 may activate one of the first to L-th memory banks 207<1:L> based on a value of the ECS bank address ECS_BADD. Each of the first to L-th memory banks 207<1:L> may include multiple cell arrays coupled to the first to M-th word lines WL<1:M> and the first to N-th column lines CL<1:N> and arranged in an array form. Each of the first to M-th word lines WL<1:M> may correspond to a value of the ECS row address ECS_RADD. Each of the first to N-th column lines CL<1:N> may correspond to a value of the ECS column address ECS_CADD, When the ECS active control signal ECS_ACT is activated, the data storage circuit 207 may activate one of the first to M-th word lines WL<1:M> based on a value of the ECS row address ECS_RADD. When the ECS read control signal ECS_RD is activated, the data storage circuit 207 may output a code word CW stored in a cell array coupled to an activated word line WL and one of the first to N-th column lines CL<1:N> each corresponding to a value of the ECS column address ECS_CADD. When the ECS write control signal ECS_WR is activated, the data storage circuit 207 may store a code word CW in a cell array coupled to an activated word line WL and one of the first to N-th column lines CL<1:N> each corresponding to a value of the ECS column address ECS_CADD. When the ECS precharge control signal ECS_PRE is activated, the data storage circuit 207 may deactivate at least one activated word line of the first to M-th word lines WL<1:M> based on a value of the ECS row address ECS_RADD.

Figure 5:
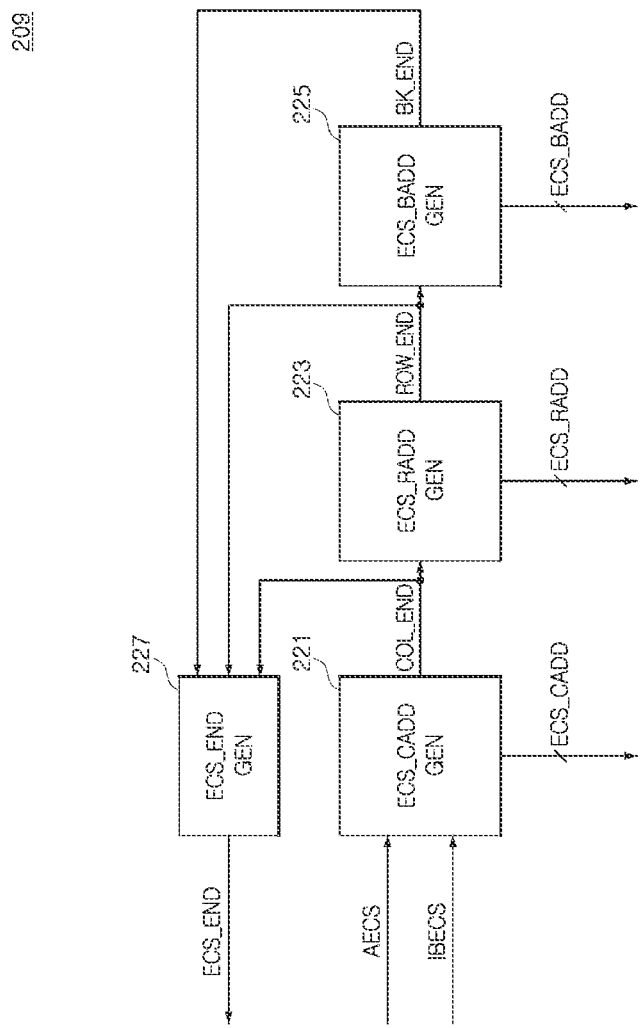
FIG. 5 is a block diagram illustrating an example configuration of an ECS address generation circuit illustrated in FIG. 3.

FIG. 5 is a block diagram illustrating an example configuration of the ECS address generation circuit 209 illustrated in FIG. 3. As illustrated in FIG. 5, the ECS address generation circuit 209 may include an ECS column address generation circuit (ECS_CADD GEN) 221, an ECS row address generation circuit (ECS_RADD GEN) 223, an ECS bank address generation circuit (ECS_BADD GEN) 225, and an ECS end flag generation circuit (ECS_END GEN) 227.

The ECS column address generation circuit 221 may generate the ECS column address ECS_CADD and a column end flag COL_END based on the auto ECS command AECS and the internal burst ECS command IBECS.

The ECS column address generation circuit 221 may sequentially increase a value of the ECS column address ECS_CADD by counting the input of the auto ECS command AECS or the internal burst ECS command IBECS. For example, when receiving the auto ECS command AECS or the internal burst ECS command IBECS for the first time, the ECS column address generation circuit 221 may set a value of the ECS column address ECS_CADD so that the value corresponds to the first column line (CL<1> in FIG. 4). Thereafter, when receiving the auto ECS command AECS or the internal burst ECS command IBECS for the second time, the ECS column address generation circuit 221 may increase the value of the ECS column address ECS_CADD corresponding to the first column line (CL<1> in FIG. 4) so that the value corresponds to the second column line (CL<2> in FIG. 4). Thereafter, when receiving the auto ECS command AECS or the internal burst ECS command IBECS for the N-th time, the ECS column address generation circuit 221 may increase a value of the ECS column address ECS_CADD corresponding an (N−1)-th column line (CL<N−1> in FIG. 4) so that the value corresponds to the N-th column line (CL<N> in FIG. 4). Thereafter, when receiving the auto ECS command AECS or the internal burst ECS command IBECS for the (N+1)-th time, the ECS column address generation circuit 221 may increase a value of the ECS column address ECS_CADD corresponding to the N-th column line (CL<N> in FIG. 4) so that the value corresponds to the first column line (CL<1> in FIG. 4).

The ECS column address generation circuit 221 may activate the column end flag COL_END when a value of the ECS column address ECS_CADD corresponds to a predetermined column line. For example, the ECS column address generation circuit 221 may activate the column end flag COL_END when a value of the ECS column address ECS_CADD corresponds to the N-th column line (CL<N> in FIG. 4). The ECS column address generation circuit 221 may deactivate an activated column end flag COL_END when a value of the ECS column address ECS_CADD corresponds to the first column line (CL<1> in FIG. 4).

The ECS row address generation circuit 223 may generate the ECS row address ECS_RADD and a row end flag ROW_END based on the column end flag COL_END.

The ECS row address generation circuit 223 may sequentially increase a value of the ECS row address ECS_RADD in synchronization with the column end flag COL_END. For example, the ECS row address generation circuit 223 may increase a value of the ECS row address ECS_RADD corresponding to the first word line (WL<1> in FIG. 4) so that the value corresponds to the second word line (WL<2> in FIG. 4), in synchronization with a time when an activated column end flag COL_END is deactivated for the first time. Thereafter, the ECS row address generation circuit 223 may increase a value of the ECS row address ECS_RADD corresponding to an (M−1)-th word line (WL<M−1> in FIG. 4) so that the value corresponds to the M-th word line (WL<M> in FIG. 4) in synchronization with a time when the activated column end flag COL_END is deactivated for the (M−1)-th time, Thereafter, the ECS row address generation circuit 223 may increase the value of the ECS row address ECS_RADD corresponding to the M-th word line (WL<M> in FIG. 4) so that the value corresponds to the first word line (WL<1> in FIG. 4) in synchronization with a time when the activated column end flag COL_END is deactivated for the M-th time.

The ECS row address generation circuit 223 may activate the row end flag ROW_END when a value of the ECS row address ECS_RADD corresponds to a predetermined word line. For example, the ECS row address generation circuit 223 may activate the row end flag ROW_END when a value of the ECS row address ECS_RADD corresponds to the M-th word line (WL<M> in FIG. 4). The ECS row address generation circuit 223 may deactivate an activated row end flag ROW_END when a value of the ECS row address ECS_RADD corresponds to the first word line (WL<1> in FIG. 4).

The ECS bank address generation circuit 225 may generate the ECS bank address ECS_BADD and a bank end flag BK_END based on the row end flag ROW_END.

The ECS bank address generation circuit 225 may sequentially increase a value of the ECS bank address ECS_BADD in synchronization with the row end flag ROW_END, For example, the ECS bank address generation circuit 225 may increase a value of the ECS bank address ECS_BADD corresponding to the first memory bank (207<1> in FIG. 4) so that the value corresponds to the second memory bank (207<2> in FIG. 4) in synchronization with a time when an activated row end flag ROW_END is deactivated for the first time, Thereafter, the ECS bank address generation circuit 225 may increase a value of the ECS bank address ECS_BADD corresponding to an (L−1)-th memory bank (207<L−1> in FIG. 4) so that the value corresponds to the L-th memory bank (207<L> in FIG. 4) in synchronization with a time when the activated row end flag ROW_END is deactivated for the (L−1)-th time, Thereafter, the ECS bank address generation circuit 225 may increase the value of the ECS bank address ECS_BADD corresponding to the L-th memory bank (207<L> in FIG. 4) so that the value corresponds to the first memory bank (207<1> in FIG. 4) in synchronization with a time when the activated row end flag ROW_END is deactivated for the L-th time.

The ECS bank address generation circuit 225 may activate the bank end flag BK_END when a value of the ECS bank address ECS_BADD corresponds to a predetermined memory bank. For example, the ECS bank address generation circuit 225 may activate the bank end flag BK_END when a value of the ECS bank address ECS_BADD corresponds to the L-th memory bank (207<L> in FIG. 4). The ECS bank address generation circuit 225 may deactivate an activated bank end flag BK_END when a value of the ECS bank address ECS_BADD corresponds to the first memory bank (207<1> in FIG. 4).

The ECS end flag generation circuit 227 may activate the ECS end flag ECS_END for indicating that the execution of an ECS operation has been terminated when all the column end flag COL_END, the row end flag ROW_END, and the bank end flag BK_END are activated.

Figure 6:
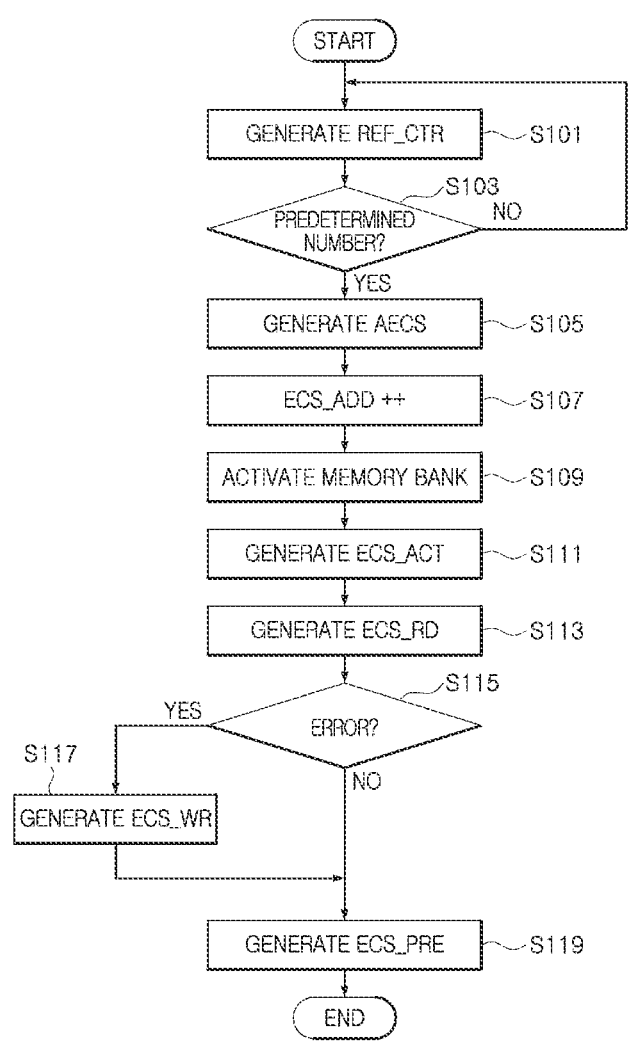
FIG. 6 is a flowchart for describing an ECS operation performed by the memory device illustrated in FIG. 3 based on a refresh control signal.

FIG. 6 is a flowchart for describing an ECS operation performed by the memory device 120 illustrated in FIG. 3 based on the refresh control signal REF_CTR.

The command decoder 201 generates the refresh command REF when receiving the command CMD for performing a refresh operation. When receiving the command CMD for entering the self-refresh mode, the command decoder 201 generates the self-refresh signal SREF activated during an interval in which the self-refresh mode is performed. When the refresh command REF is generated or a refresh period elapses in the self-refresh mode, the refresh control circuit 202 generates the refresh control signal REF_CTR for performing a refresh operation (S101).

The auto ECS control circuit 203 determines whether the refresh control signal REF_CTR has been received a predetermined number of times (S103).

After receiving the refresh control signal REF_CTR a predetermined number of times, the auto ECS control circuit 203 generates the auto ECS command AECS for performing an ECS operation (S105).

The ECS address generation circuit 209 increases a value of the ECS address ECS_ADD by counting the input of the auto ECS command AECS. More specifically, when receiving the auto ECS command AECS, the ECS address generation circuit 209 increases a value of the ECS column address ECS_CADD. The ECS address generation circuit 209 increases a value of the ECS row address ECS_RADD when receiving the auto ECS command AECS in the state in which a value of the ECS column address ECS_CADD corresponds to the N-th column line (CL<N> in FIG. 4). The ECS address generation circuit 209 increases a value of the ECS bank address ECS_BADD when receiving the auto ECS command AECS in the state in which a value of the ECS row address ECS_RADD corresponds to the M-th word line (WL<M> in FIG. 4) (S107).

The data storage circuit 207 activates one of the first to L-th memory banks 207<1:L> based on a value of the ECS bank address ECS_BADD (S109).

The ECS operation circuit 213 activates a word line corresponding to the value of the ECS row address ECS_RADD by activating the ECS active control signal ECS_ACT (S111).

The ECS operation circuit 213 outputs a code word CW stored in a cell array coupled to the activated word line and a column line corresponding to the value of the ECS column address ECS_CADD by activating the ECS read control signal ECS_RD (S113).

The ECC logic circuit 211 may determine whether a bit in which an error has occurred is present among bits of the code word CW (S115).

When the determination result of S115 indicates that a bit in which an error has occurred is present among the bits of the code word CW, the ECS operation circuit 213 stores the code word CW whose error bit has been corrected, in the cell array coupled to the activated word line and the column line corresponding to the value of the ECS column address ECS_CADD by activating the ECS write control signal ECS_WR (S117).

The ECS operation circuit 213 deactivates the word line corresponding to the value of the ECS row address ECS_RADD by activating the ECS precharge control signal ECS_PRE (S119).

Figure 7:
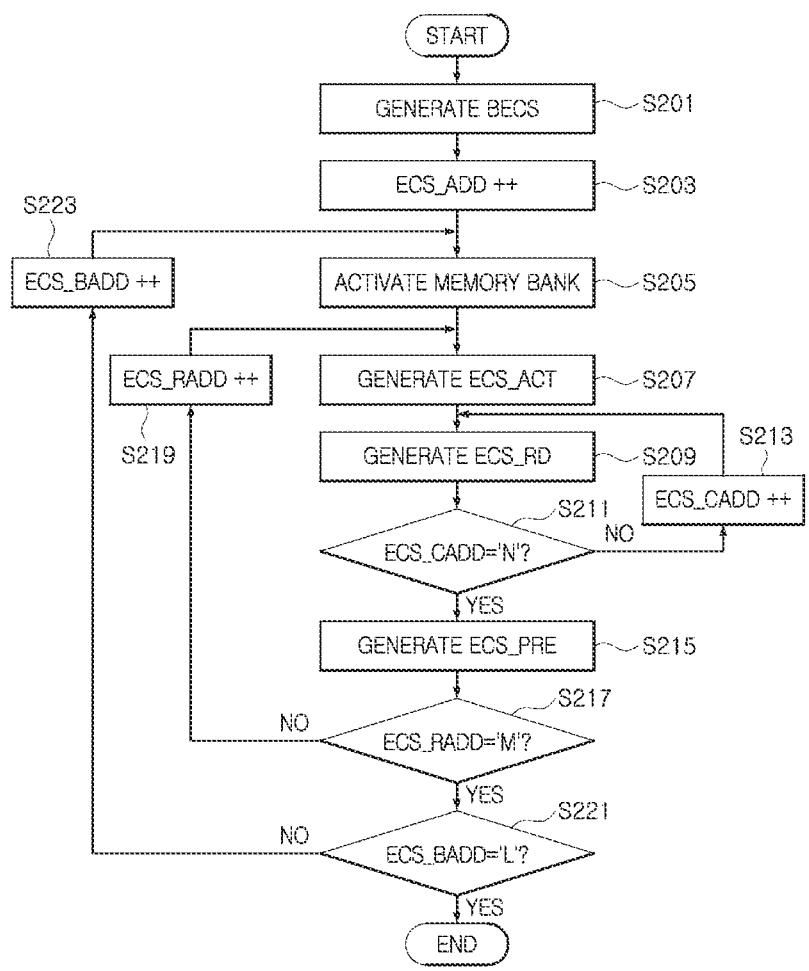
FIG. 7 is a flowchart for describing an ECS operation performed by the memory device illustrated in FIG. 3 based on a burst ECS command.

FIG. 7 is a flowchart for describing an ECS operation performed by the memory device 120 illustrated in FIG. 3 based on the burst ECS command BECS.

The command decoder 201 generates the burst ECS command BECS when receiving the command CMD for continuously performing an ECS operation (S201), The burst ECS control circuit 205 generates the internal burst ECS command IBECS every set period based on the burst ECS command BECS.

When the internal burst ECS command IBECS is generated for the first time, the ECS address generation circuit 209 increases a value of the ECS address ECS_ADD. Incrementing by a value of +1, for example, is indicated by "++" in FIG. 7. More specifically, when the internal burst ECS command IBECS is generated for the first time, the ECS address generation circuit 209 increases a value of the ECS column address ECS_CADD. The ECS address generation circuit 209 increases a value of the ECS row address ECS_RADD when the internal burst ECS command IBECS is generated for the first time in the state in which the value of the ECS column address ECS_CADD corresponds to the N-th column line (CL<N> in FIG. 4). The ECS address generation circuit 209 increases a value of the ECS bank address ECS_BADD when the internal burst ECS command IBECS is generated for the first time in the state in which the value of the ECS row address ECS_RADD corresponds to the M-th word line (WL<M> in FIG. 4) (S203).

The data storage circuit 207 activates one of the first to L-th memory banks 207<1:L> based on a value of the ECS bank address ECS_BADD (S205).

The ECS operation circuit 213 activates a word line corresponding to a value of the ECS row address ECS_RADD by activating the ECS active control signal ECS_ACT (S207).

The ECS operation circuit 213 outputs a code word CW stored in a cell array coupled to the activated word line and a column line corresponding to a value of the ECS column address ECS_CADD by activating the ECS read control signal ECS_RD (S209).

The ECS address generation circuit 209 determines whether the value of the ECS column address ECS_CADD corresponds to the N-th column line (CL<N> in FIG. 4) (S211).

When the value of the ECS column address ECS_CADD does not correspond to the N-th column line (CL<N> in FIG. 4) in S211, the ECS address generation circuit 209 increases the value of the ECS column address ECS_CADD so that S209 and S211 are repeatedly performed (S213).

When the determination result of S211 indicates that the value of the ECS column address ECS_CADD corresponds to the N-th column line (CL<N> in FIG. 4), the ECS operation circuit 213 deactivates the word line corresponding to the value of the ECS row address ECS_RADD by activating the ECS precharge control signal ECS_PRE (S215).

The ECS address generation circuit 209 determines whether the value of the ECS row address ECS_RADD corresponds to the M-th word line (WL<M> in FIG. 4) (S217).

When the determination result of S217 indicates that the value of the ECS row address ECS_RADD does not correspond to the M-th word line (WL<M> in FIG. 4), the ECS address generation circuit 209 increases the value of the ECS row address ECS_RADD so that S207, S209, S211, S213, S215, and S217 are repeatedly performed (S219).

When the determination result of S217 indicates that the value of the ECS row address ECS_RADD corresponds to the M-th word line (WL<M> in FIG. 4), the ECS address generation circuit 209 determines whether the value of the ECS bank address ECS_BADD corresponds to the L-th memory bank (207<L> in FIG. 4) (S221).

When the determination result of S221 indicates that the value of the ECS bank address ECS_BADD does not correspond to the L-th memory bank (207<L> in FIG. 4), the ECS address generation circuit 209 increases the value of the ECS bank address ECS_BADD so that S205, S207, S209, S211, S213, S215, S217, S219, and S221 are repeatedly performed (S223).

When the determination result of S221 indicates that the value of the ECS bank address ECS_BADD corresponds to the L-th memory bank (207<L> in FIG. 4), the ECS operation performed based on the burst ECS command BECS is terminated.

Figure 8:
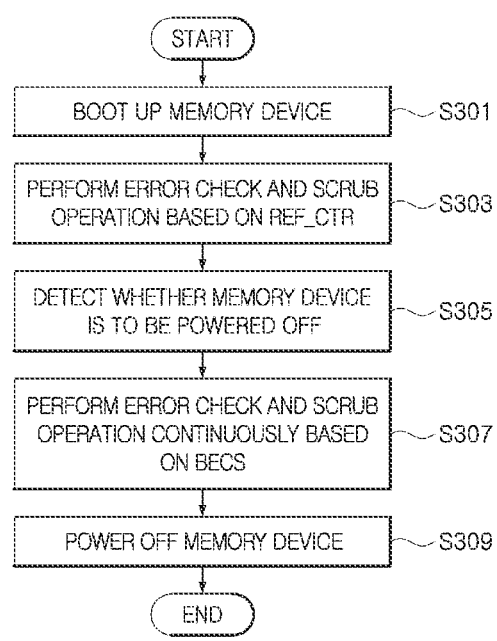
FIG. 8 is a flowchart for describing an ECS operation performed in the memory system illustrated in FIG. 1.

FIG. 8 is a flowchart for describing an ECS operation performed in the memory system 100 illustrated in FIG. 1.

The memory device 120 is booted up by being supplied with power in order to perform various internal operations (S301).

The memory controller 110 transmits, to the memory device 120, the command CMD for performing a refresh operation or the command CMD for entering the self-refresh mode. The memory device 120 generates the refresh control signal (REF_CTR in FIG. 3) whenever a refresh operation is performed. The memory device 120 increases a value of the ECS address (ECS_ADD in FIG. 3) and performs an ECS operation, whenever the refresh control signal REF_CTR is generated a predetermined number of times (S303).

The memory controller 110 detects whether power supplied to the memory device 120 is to be blocked (S305).

When the power supplied to the memory device 120 is to be blocked, the memory controller 110 transmits, to the memory device 120, the command CMD for continuously performing an ECS operation. The memory device 120 generates the burst ECS command (BECS in FIG. 3) by decoding the command CMD for continuously performing an ECS operation. The memory device 120 performs an ECS operation while sequentially increasing a value of the ECS address (ECS_ADD in FIG. 3) every set period based on the burst ECS command BECS for continuously performing an ECS operation (S307).

When the ECS address (ECS_ADD in FIG. 3) has an end value, the memory device 120 transmits, to the memory controller 110, the burst ECS end flag BECS_END indicating that the continuous execution of the ECS operation has been completed, Thereafter, the power supplied to the memory device 120 is blocked (S309).

Figure 9:
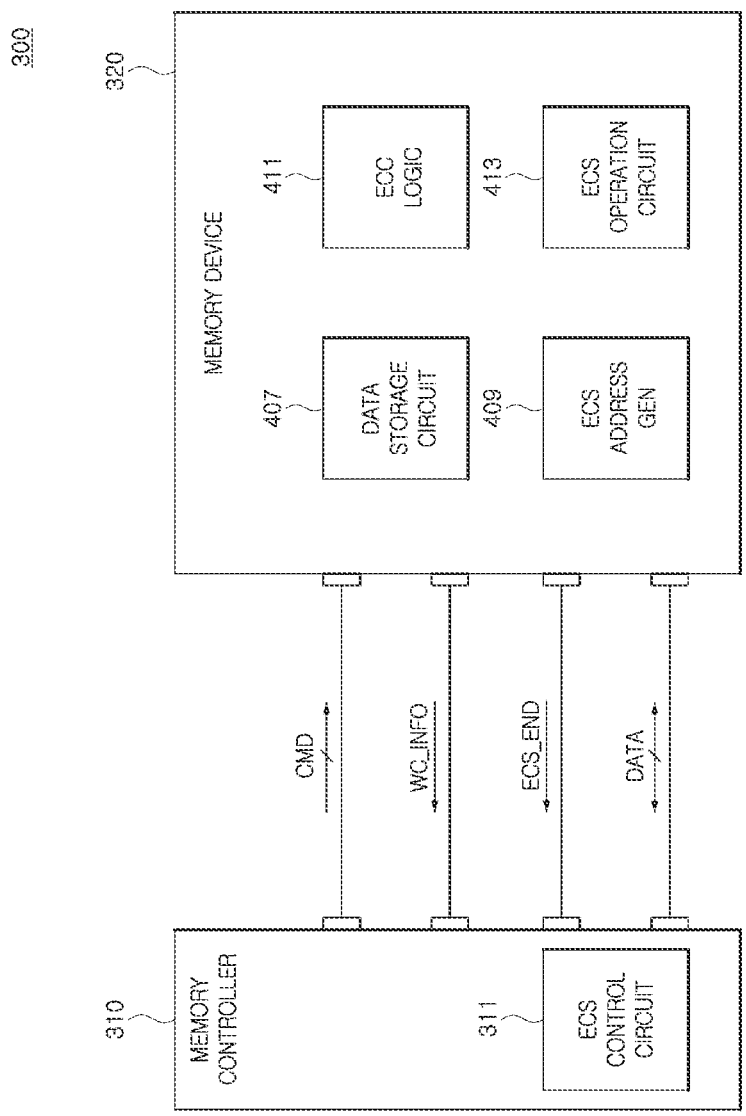
FIG. 9 is a block diagram illustrating a configuration of a memory system according another embodiment of the present disclosure.

FIG. 9 is a block diagram illustrating a configuration of a memory system 300 according another embodiment of the present disclosure. As illustrated in FIG. 9, the memory system 300 may include a memory controller 310 and a memory device 320. The memory device 320 may include multiple cell arrays in which data DATA is stored.

The memory controller 310 may include an ECS control circuit 311. The memory controller 310 may generate a command CMD which enables the memory device 320 to perform various internal operations, such as a write operation, a read operation, a refresh operation, a self-refresh mode, and an ECS operation. The memory controller 310 may generate the command CMD for performing an ECS operation through the ECS control circuit 311.

The ECS control circuit 311 may control to generate the command CMD for performing an ECS operation every first set period in order to receive weak cell information WC_INFO for a cell array included in the memory device 320 in an interval in which power supplied to the memory device 320 is maintained. The first set period may be variously set in different embodiments. The weak cell information WC_INFO may include information on the number of error bits of a code word (CW in FIG. 11) stored in at least one cell array and a location of the cell array in which the code word CW in which an error bit has occurred is stored.

When checking the weak cell information WC_INFO for all cell arrays included in the memory device 320 in an interval in which power supplied to the memory device 320 is maintained, the ECS control circuit 311 may control to continuously generate the command CMD for performing an ECS operation every second set period until an ECS end flag ECS_END is received. Furthermore, the ECS control circuit 311 may control to continuously generate the command CMD for performing an ECS operation every second set period until the ECS end flag ECS_END is received by detecting whether power supplied to the memory device 320 is to be blocked. The ECS end flag ECS_END may be transmitted by the memory device 320 when the execution of an ECS operation for all cell arrays included in the memory device 320 is completed. The second set period may be set to be shorter than the first set period.

The memory device 320 may include a data storage circuit 407, an ECS address generation circuit (ECS ADDRESS GEN) 409, an ECC logic circuit (ECC LOGIC) 411, and an ECS operation circuit 413.

The memory device 320 may sequentially perform an ECS operation on all cell arrays by receiving the command CMD for performing the ECS operation from the memory controller 310 every first set period in an interval in which power supplied to the memory device 320 is maintained. The memory device 320 may sequentially increase a value of an ECS address (ECS_ADD in FIG. 11) corresponding to a cell array from a start value to end value of the ECS address by counting the number of ECS operations executed. That is, the memory device 320 may check whether a bit in which an error has occurred is present among bits of a code word CW stored in the cell array based on the number of ECS operations executed by sequentially changing a location of the cell array in which the code word CW is stored.

The memory device 320 may perform an ECS operation on a cell array on which an ECS operation is not performed, while sequentially performing an ECS operation on all cell arrays, by continuously receiving the command CMD for performing an ECS operation from the memory controller 310 every second set period in an interval in which power supplied to the memory device 320 is maintained. Furthermore, the memory device 320 may continuously perform an ECS operation on a cell array on which an ECS operation is not performed, while sequentially performing an ECS operation on all cell arrays, by continuously receiving the command CMD for performing an ECS operation from the memory controller 310 every second set period before the power is blocked. The memory device 320 may generate the ECS end flag ECS_END indicating that the execution of an ECS operation for all cell arrays has been completed when the ECS address (ECS_ADD in FIG. 3) has an end value. Accordingly, the memory device 320 can improve the reliability of data transmission, and can prevent an ECS operation unevenly performed only on a specific cell array as power is supplied to the memory device 320 again.

The data storage circuit 407 may include multiple cell arrays in which the code word (CW in FIG. 11) is stored. The code word CW may include data DATA and parity.

Figure 11:
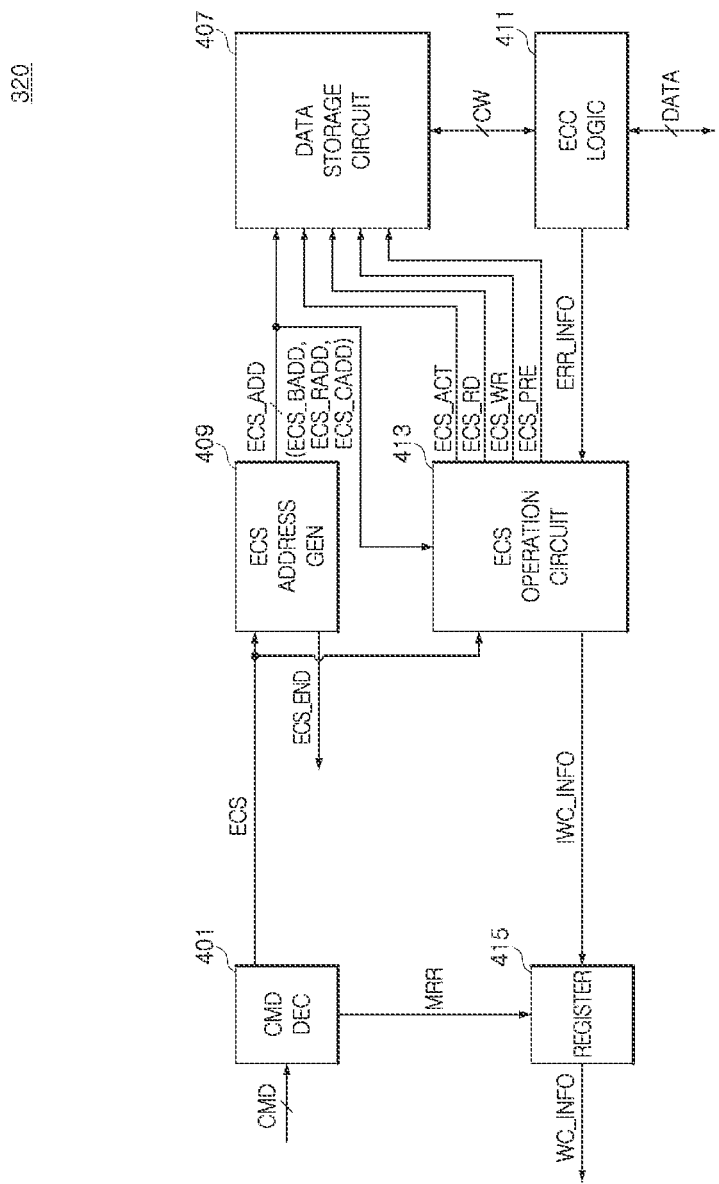
FIG. 11 is a block diagram illustrating an example configuration of a memory device illustrated in FIG. 9.

The ECS address generation circuit 409 may sequentially increase a value of the ECS address (ECS_ADD in FIG. 11) corresponding to multiple cell arrays included in the data storage circuit 407 by counting the input of an ECS command (ECS in FIG. 11). The ECS address generation circuit 409 may generate the ECS end flag ECS_END when the execution of an ECS operation for all the cell arrays included in the data storage circuit 407 is completed.

The ECC logic circuit 411 may generate error information (ERR_INFO in FIG. 11), including information on the number of error bits of a code word (CW in FIG. 11), by decoding the code word CW outputted by a cell array included in the data storage circuit 407.

When performing an ECS operation based on the ECS command (ECS in FIG. 11), the ECS operation circuit 413 may generate the weak cell information WC_INFO by receiving the error information (ERR_INFO in FIG. 11) from the ECC logic circuit 411.

Figure 10:
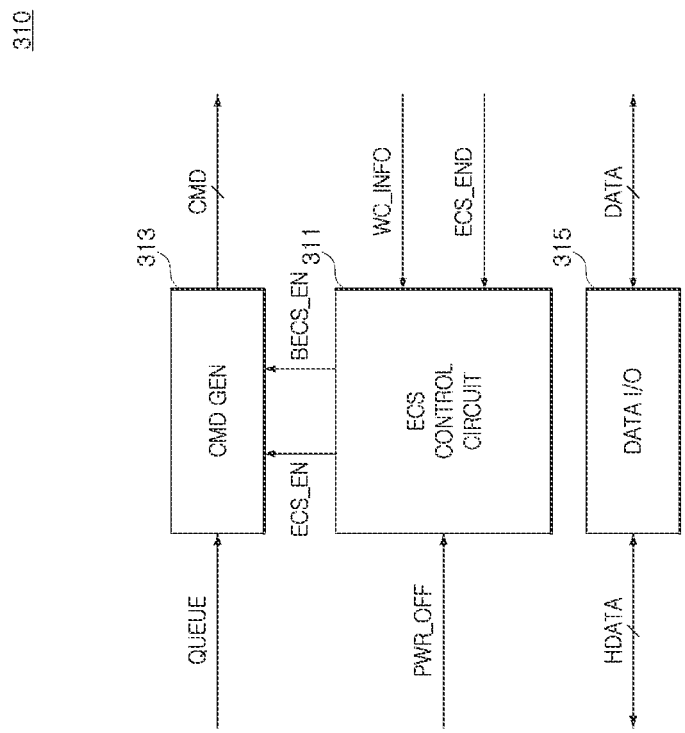
FIG. 10 is a block diagram illustrating an example configuration of a memory controller is illustrated in FIG. 9.

FIG. 10 is a block diagram illustrating an example configuration of the memory controller 310 illustrated in FIG. 9, As illustrated in FIG. 10, the memory controller 310 may include the ECS control circuit 311, a command generation circuit (CMD GEN) 313, and a data input and output circuit (DATA I/O) 315.

The ECS control circuit 311 may receive the weak cell information WC_INFO from the memory device (320 in FIG. 9), and may store the received weak cell information WC_INFO. The ECS control circuit 311 may activate an ECS enable signal ECS_EN every first set period in order to receive the weak cell information WC_INFO for a cell array included in the memory device 320. When checking the weak cell information WC_INFO for all cell arrays included in the memory device 320, the ECS control circuit 311 may activate a burst ECS enable signal BECS_EN. Furthermore, when a power-off signal PWR_OFF is activated, the ECS control circuit 311 may activate the burst ECS enable signal BECS_EN. The power-off signal PWR_OFF may be generated by detecting, by the memory controller 310, whether power supplied to the memory device 320 is to be blocked. The ECS control circuit 311 may recognize that the execution of an ECS operation for all the cell arrays included in the memory device 320 has been completed by receiving the ECS end flag ECS_END from the memory device 320. When the ECS end flag ECS_END is activated, the ECS control circuit 311 may deactivate the activated burst ECS enable signal BECS_EN.

The command generation circuit 313 may generate the command CMD that enables the memory device (320 in FIG. 9) to perform various internal operations by receiving a command queue QUEUE from a host (not illustrated). The command generation circuit 313 may generate the command CMD for performing an ECS operation whenever the ECS enable signal ECS_EN is activated. The command generation circuit 313 may generate the command CMD for performing an ECS operation every second set period during an interval in which the burst ECS enable signal BECS_EN is activated.

The data input and output circuit 315 may transmit, to the memory device (320 in FIG. 9), host data HDATA received from the host (not illustrated) as data DATA, and may transmit, to the host, data DATA received from the memory device 320 as host data HDATA.

FIG. 11 is a block diagram illustrating an example configuration of the memory device 320 illustrated in FIG. 9, As illustrated in FIG. 11, the memory device 320 may include a command decoder (CMD DEC) 401, the data storage circuit 407, the ECS address generation circuit (ECS ADDRESS GEN) 409, the ECC logic circuit (ECC LOGIC) 411, the ECS operation circuit 413, and a register 415.

The command decoder 401 may generate the ECS command ECS and a register read command MRR by decoding the command CMD. The command decoder 401 may generate the ECS command ECS by decoding the command CMD for performing an ECS operation. The command decoder 401 may generate the register read command MRR by decoding the command CMD for performing a register read operation.

The data storage circuit 407 may include multiple cell arrays in which the code word CW is stored. The code word CW may include data DATA and parity. Each of the multiple cell arrays may correspond to a value of the ECS address ECS_ADD. The ECS address ECS_ADD may include an ECS bank address ECS_BADD, an ECS row address ECS_RADD, and an ECS column address ECS_CADD. The data storage circuit 407 may store a code word CW in a cell array corresponding to a value of the ECS address ECS_ADD and output the stored code word CW, based on an ECS active control signal ECS_ACT, an ECS read control signal ECS_RD, an ECS write control signal ECS_WR, and an ECS precharge control signal ECS_PRE. A configuration and operation method of the data storage circuit 407 are implemented identically with those of the data storage circuit 207 illustrated in FIG. 3, and thus detailed descriptions of the configuration and operation method are omitted here.

The ECS address generation circuit 409 may generate the ECS address ECS_ADD and the ECS end flag ECS_END based on the ECS command ECS. The ECS address generation circuit 409 may sequentially increase a value of the ECS address ECS_ADD from a start value to end value of the ECS address by counting the input of the ECS command ECS. More specifically, when receiving the ECS command ECS, the ECS address generation circuit 409 may sequentially increase a value of the ECS column address ECS_CADD. The ECS address generation circuit 409 may sequentially increase a value of the ECS row address ECS_RADD when receiving the ECS command ECS in the state in which a value of the ECS column address ECS_CADD corresponds to a predetermined column line. The ECS address generation circuit 409 may sequentially increase a value of the ECS bank address ECS_BADD when receiving the ECS command ECS in the state in which a value of the ECS row address ECS_RADD corresponds to a predetermined word line. The ECS address generation circuit 409 may activate the ECS end flag ECS_END when the ECS address ECS_ADD has an end value. When the ECS address ECS_ADD has an end value, values of the ECS bank address ECS_BADD, the ECS row address ECS_RADD, and the ECS column address ECS_CADD may correspond to a predetermined memory bank, a predetermined word line, and a predetermined column line, respectively.

The ECC logic circuit 411 may generate a code word CW by encoding data DATA, and may generate data DATA and the error information ERR_INFO by decoding a code word CW. The ECC logic circuit 411 may generate the error information ERR_INFO, including information on the number of error bits of a code word CW and whether the code word CW in which an error bit has occurred is correctable, by decoding the code word CW based on an activated ECS read control signal ECS_RD in an ECS operation. The ECC logic circuit 411 may correct a bit in which an error has occurred among bits of a code word CW by decoding the code word CW. The ECC logic circuit 411 may transmit, to the data storage circuit 407, a code word CW whose error bit has been corrected based on an activated ECS write control signal ECS_WR in an ECS operation. An operation method of the ECC logic circuit 411 is implemented identically with that of the ECC logic circuit 211 illustrated in FIG. 3, and thus a detailed description of the operation method is omitted here.

The ECS operation circuit 413 may sequentially activate the ECS active control signal ECS_ACT, the ECS read control signal ECS_RD, the ECS write control signal ECS_WR, and the ECS precharge control signal ECS_PRE whenever an ECS operation is performed based on the ECS command ECS. The ECS operation circuit 413 may receive the error information ERR_INFO from the ECC logic circuit 411 based on an activated ECS read control signal ECS_RD. The ECS operation circuit 413 may activate the ECS write control signal ECS_WR by detecting whether a bit in which an error has occurred among bits of a code word CW is correctable based on the ECS command ECS and the error information ERR_INFO.

The ECS operation circuit 413 may generate internal weak cell information IWC_INFO based on the error information ERR_INFO and the ECS address ECS_ADD. The internal weak cell information IWC_INFO may include information on the number of error bits of a code word CW stored in at least one cell array and a location of the cell array in which the code word CW in which an error bit has occurred is stored. An operation of generating, by the ECS operation circuit 413, the internal weak cell information IWC_INFO is implemented identically with that of the ECS operation circuit 213 illustrated in FIG. 3, and thus a detailed description of the operation is omitted.

The register 415 may store the internet weak cell information IWC_INFO. When the register read command MRR is activated, the register 415 may output the stored internal weak cell information IWC_INFO as the weak cell information WC_INFO.

Figure 12:
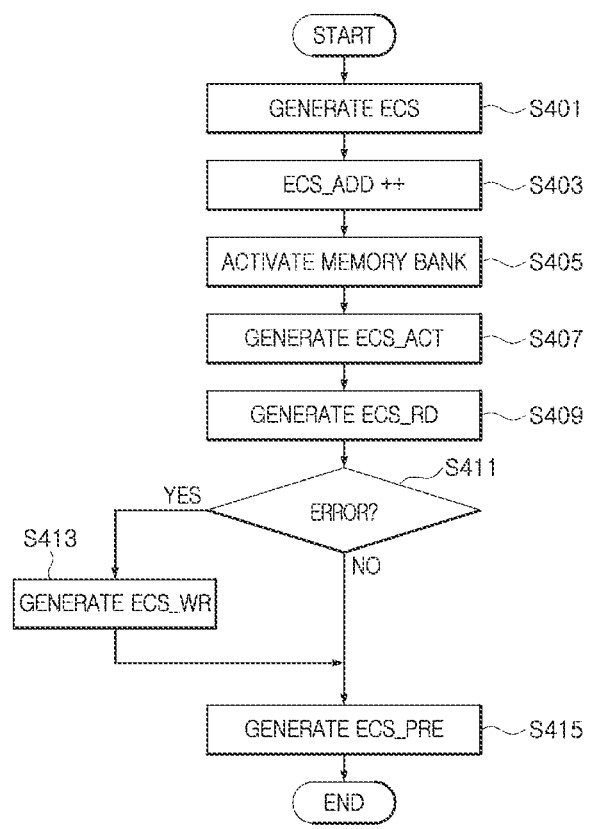
FIG. 12 is a flowchart for describing an ECS operation performed by the memory device illustrated in FIG. 11 based on an ECS command.

FIG. 12 is a flowchart for describing an ECS operation performed in the memory device 320 illustrated in FIG. 11 based on the ECS command ECS.

The command decoder 401 generates the ECS command ECS by decoding the command CMD for performing an ECS operation (S401).

The ECS address generation circuit 409 increases (++) a value of the ECS address ECS_ADD by counting the input of the ECS command ECS. More specifically, when receiving the ECS command ECS, the ECS address generation circuit 409 increases a value of the ECS column address ECS_CADD. The ECS address generation circuit 409 increases a value of the ECS row address ECS_RADD when receiving the ECS command ECS in the state in which a value of the ECS column address ECS_CADD corresponds to the N-th column line (CL<N> in FIG. 4). The ECS address generation circuit 409 increases a value of the ECS bank address ECS_CADD when receiving the ECS command ECS in the state in which a value of the ECS row address ECS_CADD corresponds to the M-th word line (WL<M> in FIG. 4) (S403).

The data storage circuit 407 activates one of the first to L-th memory banks 207<1:L> based on a value of the ECS bank address ECS_BADD (S405).

The ECS operation circuit 413 activates a word line corresponding to the value of the ECS row address ECS_RADD by activating the ECS active control signal ECS_ACT (S407).

The ECS operation circuit 413 outputs a code word CW stored in a cell array coupled to an activated word line and a column line corresponding to a value of the ECS column address ECS_CADD by activating the ECS read control signal ECS_RD (S409).

The ECC logic circuit 411 may determine whether a bit in which an error has occurred is present among bits of the code word CW (S411).

When the determination result of S411 indicates that a bit in which an error has occurred is present among the bits of the code word CW, the ECS operation circuit 413 stores the code word CW whose error bit has been corrected in the cell array coupled to the activated word line and the column line corresponding to the value of the ECS column address ECS_CADD by activating the ECS write control signal ECS_WR (S413).

The ECS operation circuit 413 deactivates the word line corresponding to the value of the ECS row address ECS_RADD by activating the ECS precharge control signal ECS_PRE (S415).

Figure 13:
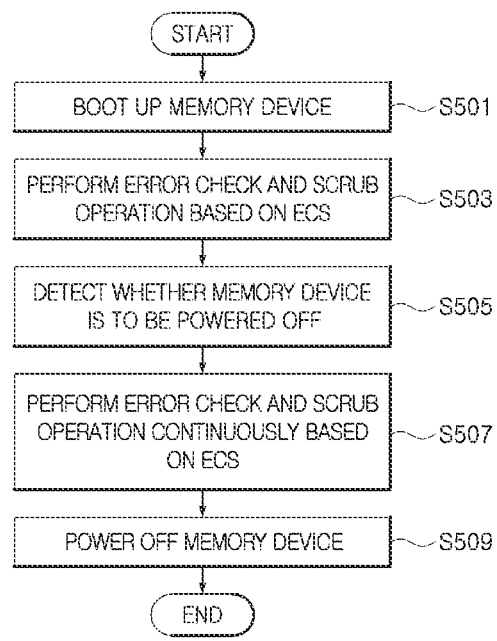
FIG. 13 is a flowchart for describing an ECS operation performed in the memory system illustrated in FIG. 9.

FIG. 13 is a flowchart for describing an ECS operation performed in the memory system 300 illustrated in FIG. 9.

The memory device 320 is booted up by being supplied with power in order to perform various internal operations (S501).

The memory controller 310 transmits the command CMD for performing an ECS operation to the memory device 320 every first set period. The memory device 320 generates the ECS command (ECS in FIG. 11) by decoding the command CMD for performing an ECS operation. The memory device 320 performs an ECS operation while sequentially increasing a value of the ECS address (ECS_ADD in FIG. 11) whenever the ECS command ECS for performing the ECS operation is generated (S503).

The memory controller 310 detects whether power supplied to the memory device 320 is to be blocked (S505).

When power supplied to the memory device 320 is to be blocked, the memory controller 310 continuously transmits the command CMD for performing an ECS operation to the memory device 320 every second set period. The memory device 320 generates the ECS command (ECS in FIG. 11) by decoding the command CMD for performing an ECS operation. The memory device 320 performs an ECS operation while sequentially increasing a value of the ECS address (ECS_ADD in FIG. 11) whenever the ECS command ECS for performing the ECS operation is generated (S507).

When the ECS address (ECS_ADD in FIG. 11) has an end value, the memory device 320 transmits, to the memory controller 310, the ECS end flag ECS_END indicating that the execution of an ECS operation for all cell arrays has been completed. Thereafter, the power supplied to the memory device 320 is blocked. The memory controller 310 stops the transmission of the command CMD for performing an ECS operation based on the ECS end flag ECS_END (S509).

What is claimed is:

1. A memory device comprising:
   an auto error check scrub (ECS) control circuit configured to generate an auto ECS command for performing an ECS operation based on a refresh control signal;
   a burst ECS control circuit configured to generate an internal burst ECS command for performing the ECS operation every set period based on a burst ECS command and an ECS end flag; and
   an ECS address generation circuit configured to:
     generate an ECS address for the ECS operation by counting an input of the auto ECS command or the internal burst ECS command, and
     generate the ECS end flag based on a value of the ECS address.

2. The memory device of claim 1, wherein:
   the auto ECS control circuit is configured to activate the auto ECS command whenever the refresh control signal is received a predetermined number of times, and
   the set period is set to be shorter than a period in which the auto ECS command is activated.

3. The memory device of claim 2, further comprising a refresh control circuit configured to generate the refresh control signal for performing a refresh operation when a refresh command is inputted or when a refresh period elapses in a self-refresh mode.

4. The memory device of claim 1, wherein the burst ECS control circuit is configured to activate the internal burst ECS command every set period from a time when the burst ECS command is activated to a time when the ECS end flag is activated.

5. The memory device of claim 4, wherein the burst ECS control circuit is configured to deactivate the internal burst ECS command during an interval in which a refresh operation is performed based on the refresh control signal.

6. The memory device of claim 1, wherein the ECS address generation circuit is configured to:
   sequentially increase a value of the ECS address from a start value to an end value of the ECS address by counting the input of the auto ECS command or the internal burst ECS command, and
   activate the ECS end flag when the ECS address has the end value.

7. The memory device of claim 6, wherein the ECS address generation circuit is configured to:
   set the value of the ECS address as the number of received auto ECS commands by counting the input of the auto ECS command, and sequentially increase the value of the ECS address from a next value of the number of received auto ECS commands to the end value when receiving the internal burst ECS command every set period.

8. The memory device of claim 6, wherein:
the ECS address comprises an ECS bank address corresponding to memory banks, an ECS row address corresponding to word lines included in the memory banks and an ECS column address corresponding to column lines included in the memory banks, and
the ECS address generation circuit comprises:
an ECS column address generation circuit configured to:
sequentially increase a value of the ECS column address by counting the input of the auto ECS command or the internal burst ECS command, and
activate a column end flag when a value of the ECS column address corresponds to a predetermined column line of the column lines;
an ECS row address generation circuit configured to:
sequentially increase the value of the ECS row address in synchronization with the column end flag, and
activate a row end flag when a value of the ECS row address corresponds to a predetermined word line of the word lines;
an ECS bank address generation circuit configured to:
sequentially increase the value of the ECS bank address in synchronization with the row end flag, and
activate a bank end flag when a value of the ECS bank address corresponds to a predetermined memory bank of the memory banks; and
an ECS end flag generation circuit configured to activate the ECS end flag when all of the column end flag, the row end flag and the bank end flag are activated.

9. The memory device of claim 1, further comprising:
an ECS operation circuit configured to generate internal weak cell information when a number of error bits of a code word stored in at least one cell array is greater than a threshold value when performing the ECS operation based on one of the auto ECS command and the internal burst ECS command, wherein the internal weak cell information comprises information on the number of error bits of the code word stored in the at least one cell array and a location of the at least one cell array; and
a register configured to:
store the internal weak cell information, and
output the internal weak cell information as weak cell information based on a register read command.

10. A memory system comprising:
a memory device configured to:
perform an error check scrub (ECS) operation every set period when receiving a command for continuously performing the ECS operation,
sequentially increase a value of an ECS address when performing the ECS operation, and
generate weak cell information from a code word stored in a cell array corresponding to the value of the ECS address; and a memory controller configured to:
generate a command for continuously performing the ECS operation by detecting whether power supplied to the memory device is to be blocked, and
receive and store the weak cell information.

11. The memory system of claim 10, wherein the memory device is configured to perform the ECS operation whenever a refresh control signal for performing a refresh operation is generated a predetermined number of times based on a command for performing the refresh operation and a command for entering a self-refresh mode.

12. The memory system of claim 10, wherein the memory device is configured to:
sequentially increase the value of the ECS address from a start value to an end value of the ECS address by counting a number of ECS operations executed, and
transmit, to the memory controller, a burst ECS end flag indicting that a continuous execution of the ECS operation has been completed when the ECS address has the end value.

13. The memory system of claim 10, wherein the memory controller is configured to generate the command for continuously performing the ECS operation, when checking the weak cell information for all cell arrays corresponding to values of the ECS address, in an interval in which power supplied to the memory device is maintained.

14. The memory system of claim 10, wherein the memory device further comprises:
an ECS operation circuit configured to generate internal weak cell information when a number of error bits of a code word stored in at least one cell array is greater than a threshold value when the ECS operation is performed; and
a register configured to:
store the internal weak cell information, and
output the internal weak cell information as the weak cell information based on a command for performing a register read operation, wherein the internal weak cell information comprises information on the number of error bits of the code word stored in the at least one cell array and a location of the at least one cell array.

15. A memory system comprising:
a memory device configured to:
sequentially increase a value of an error check scrub (ECS) address whenever a command for performing an ECS operation is received,
generate weak cell information from a code word stored in a cell array corresponding to the value of the ECS address, and
generate an ECS end flag based on the value of the ECS address; and
a memory controller configured to:
generate the command for performing the ECS operation every first set period based on a power-off signal and the ECS end flag, wherein the power-off signal is generated by detecting whether power supplied to the memory device is to be blocked, and
receive and store the weak cell information.

16. The memory system of claim 15, wherein the memory device is configured to:
sequentially increase the value of the ECS address from a start value to an end value of the ECS address by counting a number of ECS operations executed, and
activate the ECS end flag when the ECS address has the end value.

17. The memory system of claim 15, wherein the memory controller is configured to generate the command for performing the ECS operation every first set period from a time when the power-off signal is activated to a time when the ECS end flag is activated.

18. The memory system of claim 15, wherein the memory controller is configured to generate the command for performing the ECS operation every first set period, when checking the weak cell information for all cell arrays corresponding to values of the ECS address, in an interval in which power supplied to the memory device is maintained.

19. The memory system of claim 15, wherein:
the memory controller is configured to generate the command for performing the ECS operation every second set period in an interval in which the power supplied to the memory device is maintained, and
the first set period is set to be shorter than the second set period.

20. The memory system of claim 15, wherein the memory device further comprises:
an ECS operation circuit configured to generate internal weak cell information when a number of error bits of a code word stored in at least one cell array is greater than a threshold value when the ECS operation is performed, wherein the internal weak cell information comprises information on the number of error bits of the code word stored in the at least one cell array and a location of the at least one cell array; and
a register configured to:
store the internal weak cell information, and
output the internal weak cell information as the weak cell information based on a command for performing a register read operation.

* * * * *